Dec. 19, 1922.
D. B. WEBSTER ET AL.
LUMINOUS STEP.
FILED JAN. 28, 1921.
1,439,210.
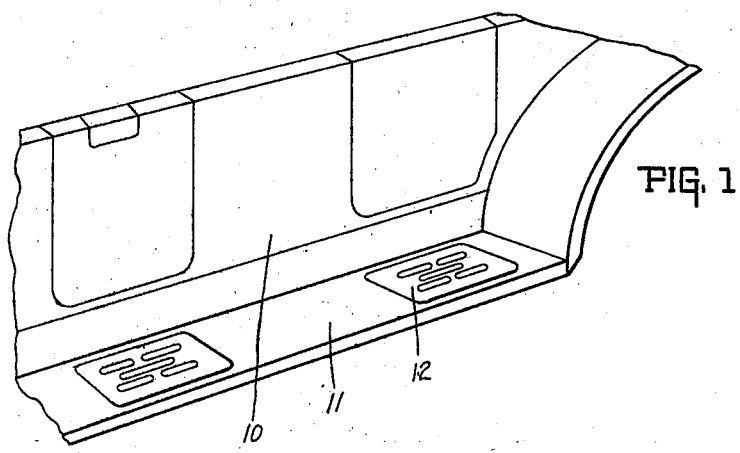
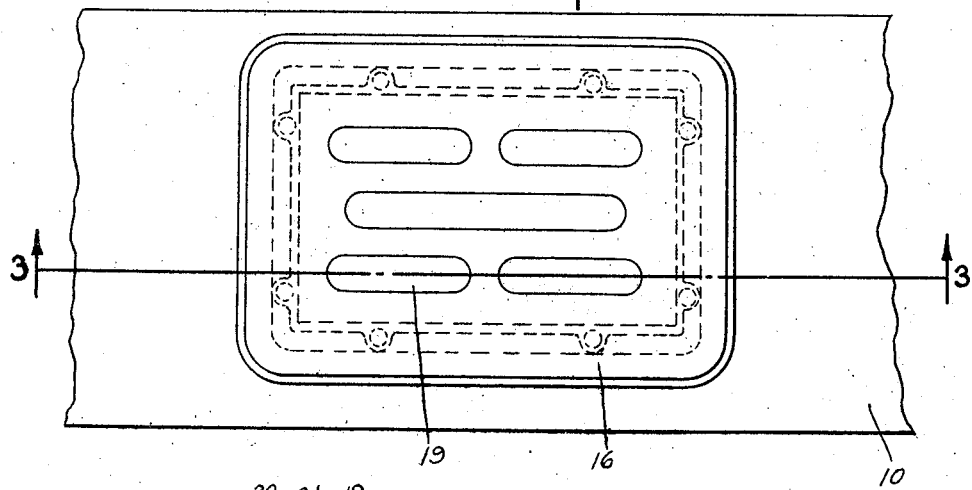
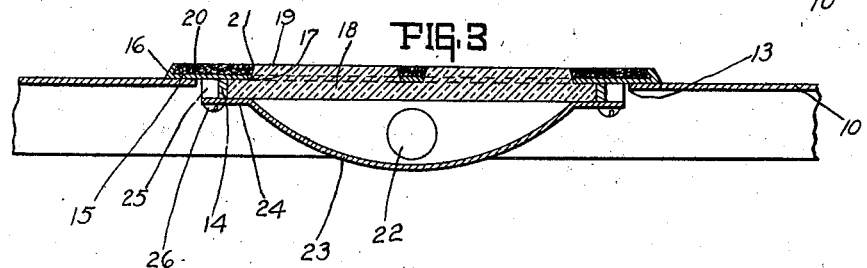
INVENTORS.
DON B. WEBSTER
FREDERICK J. RICHARDSON.
BY
ATTORNEYS.

Patented Dec. 19, 1922.

1,439,210

UNITED STATES PATENT OFFICE.

DON B. WEBSTER AND FREDERICK J. RICHARDSON, OF INDIANAPOLIS, INDIANA.

LUMINOUS STEP.

Application filed January 28, 1921. Serial No. 440,621.

*To all whom it may concern:*

Be it known that we, DON B. WEBSTER and FREDERICK J. RICHARDSON, respectively citizens of the United States, and residents of Indianapolis, county of Marion, and State of Indiana, have invented a certain new and useful Luminous Step; and we do hereby declare that the following is a full, clear, and exact description thereof, reference being had to the accompanying drawings, in which like numerals refer to like parts.

This invention relates to a luminous step for indicating the presence and position of the step.

The chief object of this invention is to provide a step which may be adapted to vehicles such as automobiles and the like which will be luminous or illuminated so as to indicate in the dark the presence and position of the step.

The chief feature of the invention consists in providing a step with perforations through which rays of light are adapted to pass, so that said step will be visible in the dark to persons approaching the same.

The full nature of the invention will be understood from the accompanying drawings and the following description and claims.

In the drawings Figure 1 is a perspective view of the side of a motor vehicle showing the invention associated with the running board thereof. Fig. 2 is an enlarged top plan view of the invention when the same is associated with the running board. Fig. 3 is a longitudinal sectional view taken on line 3—3 of Fig. 2 and in the direction of the arrows.

In the drawings, 10 indicates a portion of a motor vehicle provided with the usual running board 11; and associated with and upon said running board is a mat or step construction 12. This mat or step construction is luminous in the dark such that the presence thereof will be indicated, to persons approaching the vehicle.

The details of construction are as follows: The running board 11 is provided with an opening 13 and positioned in said opening is a preferably rectangular frame 14 provided with a plate portion 15 substantially at right angles thereto and which extends oppositely from the rectangular flange, both inwardly and outwardly therefrom. The outward extension of the plate 15 terminates in an upwardly and preferably inwardly extending flange 16 which extends angularly of said plate. The plate 15 is suitably perforated, as at 17, to provide openings therethrough. A transparent or translucent member 18 is seatable beneath the inwardly extending portion of the plate 15, but is provided with outwardly projecting portions 19 which register with and fill the openings 17 in the plate 15. Said projecting portions 19 extend to substantially the same height as the edge of the flange 16. The plate 15 is covered by a perforated cushion mat or tread 20 which is secured to said plate by the inwardly and angularly extending flange 16 and by the projecting portions 19 of the transparent or translucent member, which projections extend through the openings 21 formed in said tread, said openings 21 registering with the openings 17. The plate 15 is suitably secured to the running board 10 in any suitable manner as desired.

In the present instance the means for illuminating the step or making the same luminous comprises a lamp or source of illumination 22 positioned beneath the transparent or translucent member 18. Positioned beneath said lamp or source of illumination is a protecting closure member 23, which preferably is curved and forms a reflector for the illuminating means positioned beneath the transparent member 18. The reflector 23 is provided with a flange portion 24, and said flange portion is secured to the supporting frame 14 and simultaneously secures the transparent plate 18 thereto by the bosses 25 having threaded openings adapted to receive the screws 26. Any other suitable means may be used to secure said reflector and closure member to the step construction described.

While the invention has been described in great detail, it will be understood that many modifications thereof will readily suggest themselves to those skilled in the art to which this invention applies; and said modifications are all considered to be within the broad purview of this invention as outlined by the appended claims.

The invention claimed is:

1. In a step construction for a vehicle, the combination of means for illuminating said step including a frame having a plurality of apertures therein, each of said apertures having beveled edges, a casing rigidly secured to said frame, a glass plate having projections formed thereon adapted to extend through said apertures, said apertures having their beveled edges arranged to coincide with the beveled edges of said frame, a tread surface mounted on said frame around said apertures, and means in said casing for illuminating said step through the glass plate therein.

2. A luminous step including a plate, flange means included therewith, a perforated tread supported upon said plate and secured thereto by said flange means, said plate having a perforation therein registering with the tread perforations, light transmitting means positioned adjacent said perforations and extending into the same and terminating flush therewith, and illuminating means positioned adjacent said transmitting means.

In witness whereof, we have hereunto affixed our signatures.

DON B. WEBSTER.
FREDERICK J. RICHARDSON.